United States Patent [19]

Clark

[11] Patent Number: 5,044,475

[45] Date of Patent: Sep. 3, 1991

[54] ROTARY DRUM BRAKE ASSEMBLY BRACKET

[75] Inventor: James R. Clark, Plainwell, Mich.

[73] Assignee: Eaton Corporation, Cleveland, Ohio

[21] Appl. No.: 515,899

[22] Filed: Apr. 27, 1990

[51] Int. Cl.[5] ............................................. F16D 51/00
[52] U.S. Cl. ..................... 188/329; 188/216; 188/330; 188/205 R; 188/250 F
[58] Field of Search ............... 188/329, 327, 328, 330, 188/332, 338, 250 A, 250 F, 339, 216, 140 A, 250 R, 205, 325; 192/93 R, 78, 75

[56] References Cited

U.S. PATENT DOCUMENTS

| | | | |
|---|---|---|---|
| 1,728,384 | 9/1929 | Whitworth | 188/330 |
| 1,771,011 | 7/1930 | Sauzedde | 188/330 |
| 1,908,745 | 5/1933 | Ford | 188/330 X |
| 2,059,270 | 11/1936 | Parker | 188/329 X |
| 2,064,103 | 12/1936 | Burdick | 188/78 |
| 2,106,717 | 2/1938 | Cadman | 188/140 A X |
| 2,751,048 | 6/1956 | Super et al. | 188/78 |
| 2,788,866 | 4/1957 | Porsche et al. | |
| 3,016,112 | 1/1962 | Helvern | 188/341 X |
| 3,837,446 | 9/1974 | Nilsson | 188/329 |
| 4,064,978 | 12/1977 | Wunderlick | 188/331 |
| 4,216,850 | 8/1980 | Kizaki | 188/216 |

FOREIGN PATENT DOCUMENTS

| | | | |
|---|---|---|---|
| 478156 | 3/1927 | Fed. Rep. of Germany | 188/329 |
| 714206 | 6/1930 | France | 188/330 |

*Primary Examiner*—Douglas C. Butler
*Attorney, Agent, or Firm*—A. E. Chrow

[57] ABSTRACT

An anchor collar or bracket (100) is provided that is adapted to fit loosely about a shaft (34) of a rotary drum brake assembly such as assembly (200). Bracket (100) is adapted to secure at least one pair of resilient biasing members such as coiled springs (36 and 36') to respective pivotally mounted opposed brake shoe assemblies (20 and 20') and resiliently urge them towards each other upon release of the brake while being able to be moved to enable access to hidden portions therebehind.

16 Claims, 2 Drawing Sheets

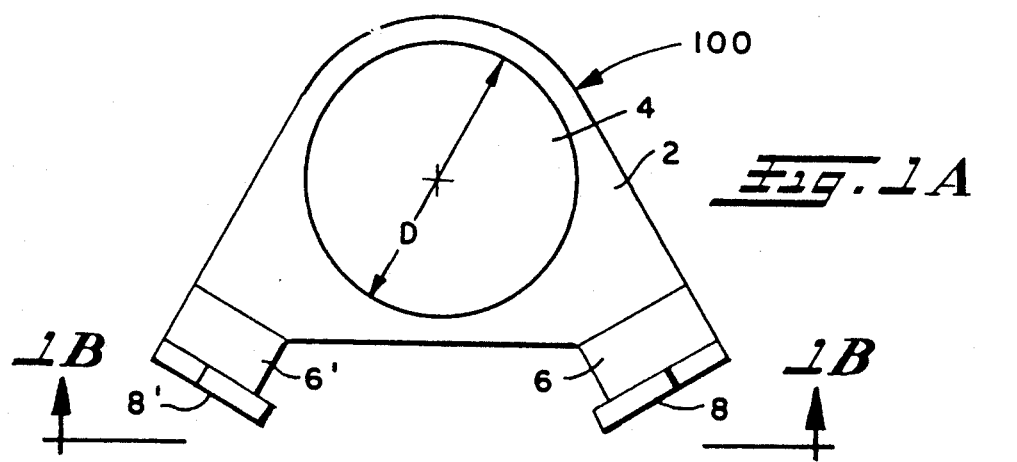
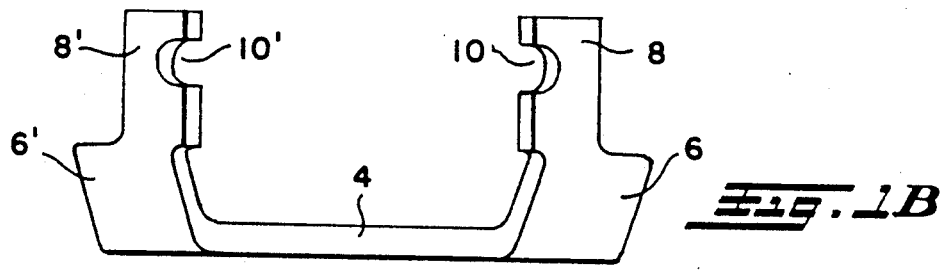
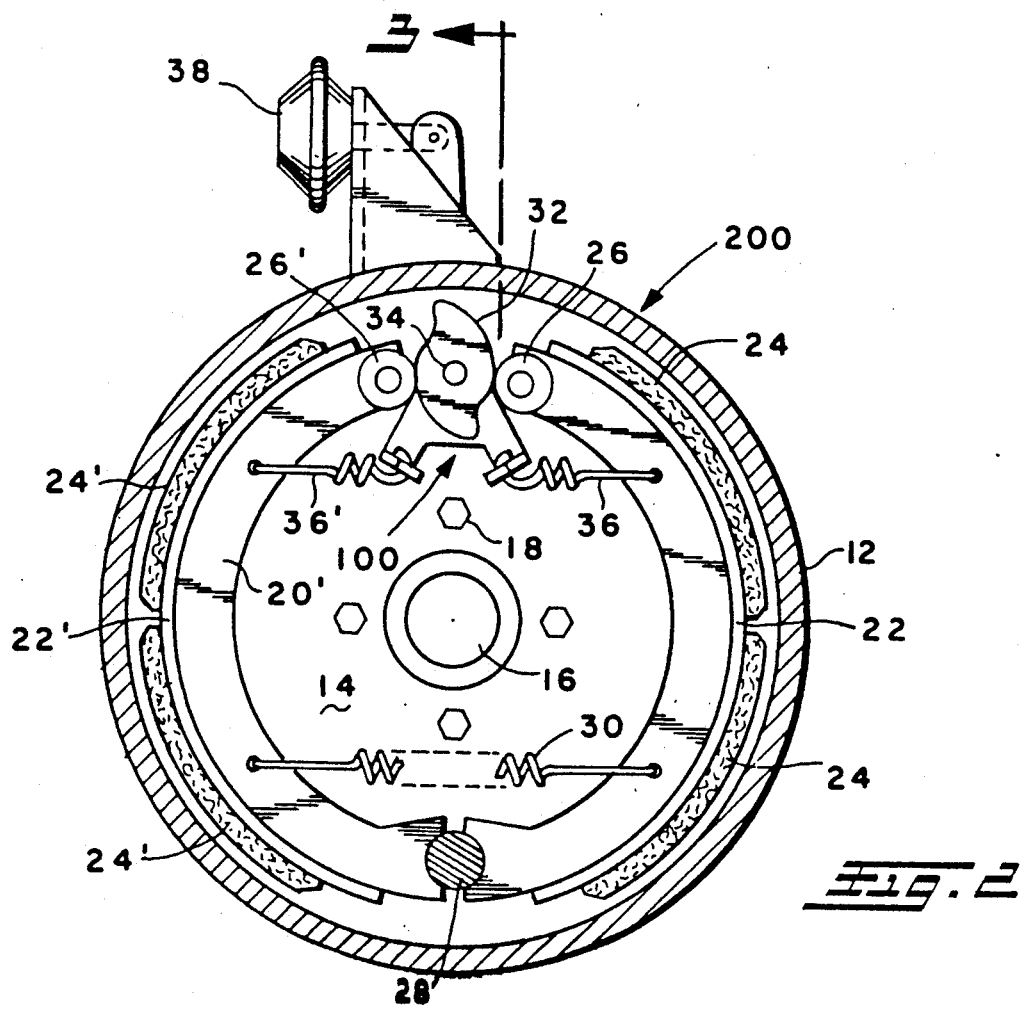

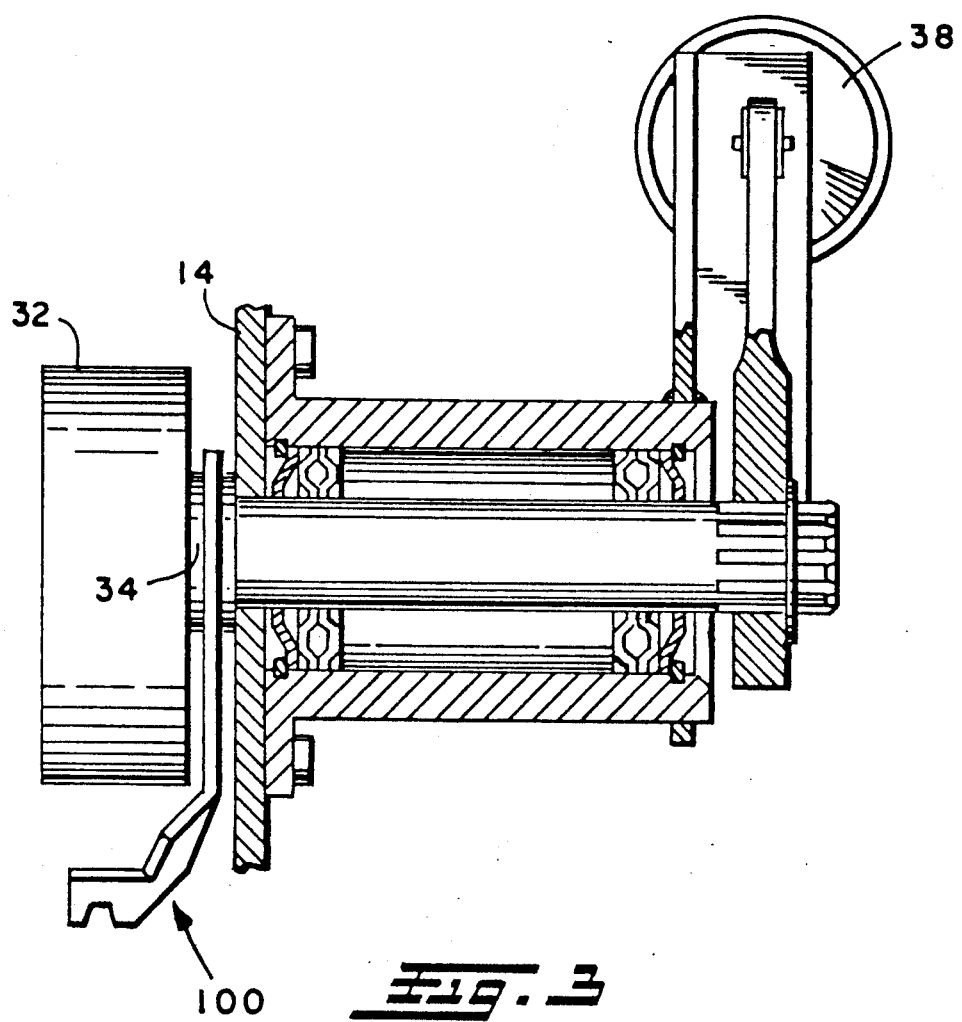

ROTARY DRUM BRAKE ASSEMBLY BRACKET

INTRODUCTION

This invention relates generally to a cam actuated, pivoted shoe type rotary drum brake assembly and particularly to a vehicular rotary drum brake assembly and more particularly to such assembly that utilizes a movable anchor bracket or collar for securing one end of each of a pair of coiled return springs or the like whose opposite ends are secured to respective brake shoe assemblies and are operative to urge the brake shoe assemblies inwardly towards each other for a distance sufficient to disengage the brakes when the brake is released.

BACKGROUND OF THE INVENTION

Rotary drum brake assemblies are well known in the art of braking motor vehicles wheels. Such assemblies characteristically include a stationary backing or torque plate secured to the end of the axle and about which rotates a rotary drum to which the wheel is secured. The brake assembly features a pair of opposed brake shoe assemblies that are respectively pivotally mounted to the backing plate within the drum and carry frictional braking material facing theretowards. Upon application of the brakes, a mechanism, such as a rotary or a wedge cam disposed between the opposite end of the brake shoe assemblies, is caused to rotate or be axially displaced and spread the brake shoe assemblies apart for a distance sufficient to enable the braking material to frictionally engage the drum for the braking thereof.

At least one and often two or more resilient biasing members such as coiled springs (usually called "return springs") are employed to resiliently urge the brake shoe assemblies towards each other for a distance sufficient to disengage the frictional braking material from the drum upon release of the brake.

Examples of rotary drum brake assemblies and the various means employed to secure the biasing members so that they operate in the manner described above are disclosed in U.S. Pat. Nos. 2,064,103; 2,751,048; 2,788,866; 3,837,446; 4,064,978 and 4,216,850, the disclosures of all of which are incorporated herein by reference.

All of the above disclosed brake assemblies feature however the biasing members secured to both of the brake shoe assemblies or between each brake shoe assembly and a stationary bracket that is fixially secured to the locking plate most often at a location between the pivoted ends of the brake shoe assemblies rather than between the opposite end where the rotary cam or other brake shoe spreading mechanism is located.

Such stationary brackets characteristically require special drilling and tapping or other means of fixedly securing the bracket that are costly and time consuming to install and further require the expense and time of having to be loosened or removed in the event they block portions of the brake assembly hidden behind the bracket to which access is desired. Additionally, the collar or bracket of the invention enables the return springs to be located close to the actuating cam and thereby increasing the mechanical advantage in pivoting the brake shoe assemblies towards each other upon release of the brake.

SUMMARY OF THE INVENTION

Accordingly, it is an object of this invention to provide a movable collar or bracket for securement of springs and the like that are operative in a rotary drum brake assembly to disengage the brakes upon the release of the brake.

It is another object of this invention to provide a movable collar or bracket for use in a rotary drum brake assembly that is simple in design and able to be easily installed for enabling return springs and the like to disengage the brakes upon the release thereof.

It is still another object of this invention to provide a bracket for securing springs and the like to the brake shoe assemblies that is inexpensive and easy to install and is able to be moved sufficiently to provide access therebehind without having to remove the bracket from the brake shoe assemblies and and that further removes all parts of the spring from the area between the cam and the hub, enabling larger than normal hubs or other components (such as electric sensor "tone rings") to be placed in this area.

It is yet other object of this invention to provide a rotary drum brake assembly that utilizes a movable collar or bracket for securing springs and the like to the brake shoe assemblies that is inexpensive and simple in design and enables access to regions therebehind without having to remove the bracket from the assembly.

BRIEF DESCRIPTION OF THE DRAWING

FIG. 1A is a front view of an embodiment of a bracket 100 of the invention;

FIG. 1B is a side view of bracket 100 of FIG. 1A taken along view line 1B—1B;

FIG. 2 is a partially sectioned front view of a rotary drum brake assembly 200 using bracket 100 of FIGS. 1A and 1B; and FIG. 3 is a side view of a portion of the rotary drum brake assembly 200 taken along view line 3—3 of FIG. 2.

DESCRIPTION OF SOME PREFERRED EMBODIMENTS

Anchor bracket or collar 100 of FIG. 1A and 1B has a substantially flat base portion 2 from which extend spaced apart legs 6 and 6' that are bent to form end tabs 8 and 8' respectively. Tabs 8 and 8' preferably include notches 10 and 10' for respectively receiving an end of return springs 36 and 36' as shown in FIG. 2.

Legs 6 and 6' and end tabs 8 and 8' are preferably bent relative base portion 2 so that they extend outwardly away from stationary backing plate 2 and clear the largest most periphery of rotary cam 32 as hereinafter described with respect to FIG. 3.

Although shown as having a specific configuration in the FIGURES, it is to be understood that the bracket of the invention may have any configuration that is movable after mounting as hereinafter described and that is adapted, after mounting, to secure at least one biasing member such as a coiled spring to each brake shoe assembly as hereinafter described with respect to FIG. 2.

Bracket 100 has an aperture 4 therethrough having a diameter "D" that is larger than the diameter of rotary shaft 34 by an amount predetermined to enable it to move without inhibiting its ability to secure the biasing members to the brake shoe assemblies as previously described. Bracket 100 also has a thickness predetermined to enable it to be mounted on shaft 34 between rotary cam 32 and stationary braking plate 14 as hereinafter described with respect to FIG. 3. Accordingly, bracket 100 is preferably made from sheet metal having strength and corrosion resistance predetermined suitable for vehicular wheel braking applications.

Rotary drum brake assembly 200 of FIG. 2 has a stationary backing plate 14 mounted to the stationary casing end of axle 16 by bolts 18 or the like. A rotary drum 12 is mounted upon the rotary hub end of axle 16 to which the wheel is mounted and accordingly rotates in unison therewith.

A pair of opposed brake shoe assemblies 20 and 20' are pivotally mounted on stationary plate 14 by means of tension retaining spring 30 secured therebetween and holding one end in pivotal engagement with pin 28 extending from plate 14.

Brake shoe assemblies 20 and 20' respectively include arcuate flanges 22 and 22' that respectively carry a frictional braking material 24 and 24' facing towards drum 12.

A rotary cam, such as an "S" cam well known in expansible braking art, is mounted on the end of rotary shaft 34 extending between the opposite ends of brake shoe assemblies 20 and 20' respectively carrying rollers 26 and 26' that are adapted to engage the cam surface of cam 32. Shaft 34 and cam 32 are rotated in one direction upon actuation of the brake pedal or handle and are rotated in an opposite direction upon release of the brake pedal or handle. Such can be accomplished by fluid mediums such as hydraulic or air that operate against a diaphragm such as contained in housing 38 that in turn act upon levers that are attached to shaft 34 by means of splines and the like such as shown in FIG. 3.

Rotation of cam 32 causes brake shoe assemblies 20 and 20' to spread apart and move away from each other for a distance sufficient to enable frictional braking material 24 and 24' to frictionally engage rotating drum 12 with sufficient force to effect the braking thereof.

As shown in FIGS. 2 and 3, bracket 100 is mounted loosely on shaft 34 behind cam 32. A pair of resilient biasing members such as coiled springs 36 and 36' have one end secured to brake shoe assemblies 20 and 20' and are opposite end to bracket 100 at tab ends 8 and 8' respectively and such that a portion of their ends are received through notches 10 and 10'. Coiled return springs 36 and 36' are preferably balanced and feature essentially the same spring constants so that they pull on bracket 100 with substantially equal force when brake shoe assemblies 20 and 20' are spread apart by cam 32.

Upon release of the brake pedal, coiled return springs 36 and 36' operate to resiliently urge brake assemblies 20 and 20' towards each other for a distance sufficient to cause the braking material 24 and 24' to disengage from drum 12 with a predetermined minimum amount of clearance therebetween.

It can readily be seen that by being mounted loosely upon shaft 34, bracket or collar 100 can be moved radially virtually in any direction while springs 36 and 36' remain attached thereto enabling access to bolts and the like that may be hidden therebehind.

Rotary drum brake assemblies using the bracket or collar of the invention may further include additional biasing members such as spring 30 that operate to assist the biasing members attached to bracket 100 in urging the brake shoe assemblies toward each other when the brake is released and as such the invention is not limited to examples where the additional spring operates to maintain pivotal engagement of the brake shoe ends against pin 28 but also where the brake shoe assemblies are pivotally mounted thereto and an additional spring such as spring 30 operates solely to assist springs such as springs 36 and 36' in resiliently urging the brake shoe assemblies towards each other when the brake is released.

What is claimed is:

1. A rotary drum brake assembly comprising;
   a stationary backing plate,
   a pair of opposed brake shoe assemblies respectively having one end pivotally secured to the stationary plate and carrying a frictional braking material facing towards the drum,
   a cam disposed between the opposite ends of the brake shoe assemblies, said cam mounted on a rotary shaft and operative to rotate and urge said brake shoe assemblies away from each other and cause the frictional braking material to engage the drum upon actuation of the brake,
   an anchor bracket having an aperture for receiving the rotary shaft therethrough, said bracket mounted on the shaft and movable relative thereto, and
   biasing means, respectively securing each brake shoe assembly to the bracket and operative to urge the brake shoe assemblies towards each other and away from the drum upon release of the brake.

2. The assembly of claim 1 wherein the biasing means comprises at least one coiled spring having an end secured to the bracket and on opposite end secured to the brake shoe assembly.

3. The assembly of claim 1 further including additional biasing means for urging the brake shoe assemblies towards each other when the brake is released.

4. The assembly of claim 3 wherein the additional biasing means comprises at least one coiled spring.

5. An anchor bracket for a rotary drum brake assembly of the type comprising a stationary backing plate, a pair of opposed brake shoe assemblies respectively having one end pivotally secured to the stationary plate and carrying a frictional braking material facing towards the drum, a cam disposed between the opposite ends of the brake shoe assemblies and mounted on a rotary shaft and operative to rotate and urge the brake shoe assemblies away from each other and cause the frictional braking material to engage the drum upon actuation of the brake, and biasing means respectively secured to the brake shoe assemblies, said bracket having an aperture for receiving the rotary shaft therethrough and to enable the bracket to move relative thereto, and said bracket enabling the biasing means to be secured thereto in such a manner that the biasing means urge the brake shoe assemblies towards each other upon release of the brake.

6. The bracket of claim 5 wherein the biasing means comprises a coiled spring.

7. The bracket of claim 3 wherein the rotary drum brake assembly further includes additional biasing means for urging the brake shoe assemblies towards each other upon release of the brake.

8. The bracket of claim 7 wherein the additional biasing means comprises at least one coiled spring.

9. A rotary drum brake assembly comprising;
   a stationary backing plate,
   a pair of opposed brake shoe assemblies respectively having one end pivotally secured to the stationary plate and carrying a frictional braking material facing towards the drum, an actuating cam disposed between the opposite ends of the brake shoe assemblies, said cam mounted on an actuating member and operative to urge such brake shoe assemblies away from each other and cause the frictional braking material to engage the drum upon actuation of the brake, an anchor bracket having an aperture for receiving the actuating member therethrough, said bracket mounted on the actuating member and movable relative thereto, and biasing means, respectively securing each brake shoe assembly to the bracket and operative to urge the brake shoe assemblies towards each other and away from the drum upon release of the brake.

10. The assembly of claim 9 wherein the biasing means comprising at least one coiled spring having an end secured to the bracket and on opposite end secured to the brake shoe assembly.

11. An anchor bracket for a rotary drum brake assembly of the type comprising a stationary backing plate, a pair of opposed brake shoe assemblies respectively having one end pivotally secured to the stationary plate and carrying a frictional braking material facing towards the drum, an actuating cam disposed between the opposite ends of the brake shoe assemblies and mounted on an actuating member and operative to rotate and urge the brake shoe assemblies away from each other and cause the frictional braking material to engage the drum upon actuation of the brake, and biasing means respectively secured to the brake shoe assemblies, said bracket having an aperture for receiving the actuating member therethrough and to enable the bracket to move relative thereto, and said bracket enabling the biasing means to be secured thereto in such a manner that the biasing means urge the brake shoe assemblies towards each other upon release of the brake.

12. The bracket of claim 11 wherein the biasing means comprises a coiled spring.

13. The assembly of claim 11 further including additional biasing means for urging the brake shoe assemblies towards each other when the brake is released.

14. The assembly of claim 13 wherein the additional biasing means comprises at least one coiled spring.

15. The bracket of claim 11 wherein the rotary drum brake assembly further includes additional biasing means for urging the brake shoe assemblies towards each other upon release of the brake.

16. The bracket of claim 15 wherein the additional biasing means comprises at least one coiled spring.

* * * * *